United States Patent
Rahman et al.

(10) Patent No.: US 11,974,147 B2
(45) Date of Patent: *Apr. 30, 2024

(54) DYNAMIC CLOUDLET FOG NODE DEPLOYMENT ARCHITECTURE

(71) Applicant: AT&T Intellectual Property I, L.P., Atlanta, GA (US)

(72) Inventors: Moshiur Rahman, Marlboro, NJ (US); Shrikant Acharya, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,037

(22) Filed: Oct. 12, 2022

(65) Prior Publication Data

US 2023/0061112 A1 Mar. 2, 2023

Related U.S. Application Data

(63) Continuation of application No. 17/095,002, filed on Nov. 11, 2020, now Pat. No. 11,503,480, which is a
(Continued)

(51) Int. Cl.
*H04W 24/02* (2009.01)
*H04L 41/0893* (2022.01)
(Continued)

(52) U.S. Cl.
CPC ......... *H04W 24/02* (2013.01); *H04L 41/0893* (2013.01); *H04L 41/5025* (2013.01);
(Continued)

(58) Field of Classification Search
CPC ..... H04W 24/02; H04W 24/08; H04W 24/10; H04L 41/0893; H04L 41/5025; H04L 41/5051; H04L 43/16; H04L 41/0894
See application file for complete search history.

(56) References Cited

U.S. PATENT DOCUMENTS 8,671,403 B2 3/2014 Sundarrajan et al.
8,938,769 B2 1/2015 Rakib
(Continued)

FOREIGN PATENT DOCUMENTS

CN 107948129 A1 4/2018
CN 109257193 A1 1/2019
(Continued)

OTHER PUBLICATIONS

Non-Final Office Action received for U.S. Appl. No. 16/380,403 dated Jan. 7, 2020, 28 pages.
(Continued)

*Primary Examiner* — El Hadji M Sall
(74) *Attorney, Agent, or Firm* — Guntin & Gust, PLC; Dana LeMoine

(57) ABSTRACT

An architecture for providing an on-demand dynamic cloudlet instantiation by leveraging a grouping of software defined network devices and their respective associated analytics modules. A method can comprise receiving quality of service data representing a 5G small cell device of a group of 5G small cell devices; generating a policy rule representing a predictive policy to facilitate an instantiation of a dynamic on-demand cloudlet node into a fog of dynamic on-demand cloudlet node instantiations; and facilitating the instantiation of the dynamic on-demand cloudlet node into the fog, by a hybrid fiber coaxial device, based on the policy rule and an indication received from the hybrid fiber coaxial that a traffic surge in communications with the 5G small cell device has occurred.

20 Claims, 10 Drawing Sheets

Related U.S. Application Data continuation of application No. 16/421,944, filed on May 24, 2019, now Pat. No. 10,848,988.

(51) Int. Cl.
*H04L 41/5025* (2022.01)
*H04L 41/5051* (2022.01)
*H04L 43/16* (2022.01)
*H04W 24/08* (2009.01)

(52) U.S. Cl.
CPC ......... *H04L 41/5051* (2013.01); *H04L 43/16* (2013.01); *H04W 24/08* (2013.01)

(56) References Cited

U.S. PATENT DOCUMENTS

| | | | |
|---|---|---|---|
| 8,989,024 B2 | 3/2015 | Shaw et al. | |
| 9,229,711 B2 | 1/2016 | Arasaratnam | |
| 9,298,515 B2 | 3/2016 | Mcmurry et al. | |
| 9,363,278 B2* | 6/2016 | Maria | H04L 63/1416 |
| 9,547,564 B1 | 1/2017 | Troutman et al. | |
| 9,690,609 B2 | 6/2017 | Lawler | |
| 9,720,724 B2 | 8/2017 | Agrawal et al. | |
| 9,798,571 B1 | 10/2017 | Cao et al. | |
| 9,843,485 B2 | 12/2017 | Desai et al. | |
| 9,906,458 B2 | 2/2018 | Phillips et al. | |
| 9,942,104 B2 | 4/2018 | Flavel et al. | |
| 9,952,888 B2 | 4/2018 | Dowlatkhah et al. | |
| 9,996,381 B1 | 6/2018 | Raju et al. | |
| 10,104,548 B1 | 10/2018 | Dowlatkhah et al. | |
| 10,819,434 B1 | 10/2020 | Rahman | |
| 11,228,915 B2 | 1/2022 | Mwanje et al. | |
| 2013/0268799 A1 | 10/2013 | Mestery et al. | |
| 2014/0362714 A1 | 12/2014 | Day et al. | |
| 2016/0127975 A1* | 5/2016 | Hu | H04L 45/64 455/445 |
| 2016/0157133 A1 | 6/2016 | Ehsan et al. | |
| 2016/0239330 A1 | 8/2016 | Mc et al. | |
| 2016/0359592 A1 | 12/2016 | Kulshreshtha et al. | |
| 2016/0359677 A1 | 12/2016 | Kulshreshtha et al. | |
| 2017/0031706 A1 | 2/2017 | Podvratnik et al. | |
| 2017/0048308 A1 | 2/2017 | Qaisar | |
| 2017/0272365 A1 | 9/2017 | Wei et al. | |
| 2017/0295109 A1 | 10/2017 | Byers et al. | |
| 2017/0374032 A1* | 12/2017 | Woolward | H04L 63/0263 |
| 2018/0026944 A1* | 1/2018 | Phillips | H04L 63/1433 726/4 |
| 2018/0063020 A1 | 3/2018 | Bhagavatula et al. | |
| 2018/0183855 A1 | 6/2018 | Sabella et al. | |
| 2018/0206133 A1 | 7/2018 | Venkatraman et al. | |
| 2018/0270103 A1 | 9/2018 | Chapman et al. | |
| 2018/0270780 A1 | 9/2018 | Xiong et al. | |
| 2018/0302807 A1 | 10/2018 | Chen et al. | |
| 2018/0310292 A1 | 10/2018 | Yang et al. | |
| 2018/0316725 A1 | 11/2018 | Mani et al. | |
| 2018/0321974 A1 | 11/2018 | Ferris | |
| 2018/0331885 A1 | 11/2018 | Raymond et al. | |
| 2018/0337820 A1 | 11/2018 | Chen et al. | |
| 2018/0338017 A1 | 11/2018 | Mekuria et al. | |
| 2018/0359658 A1 | 12/2018 | Chitrapu | |
| 2019/0036869 A1 | 1/2019 | Jana | |
| 2019/0044794 A1 | 2/2019 | Chew | |
| 2019/0089748 A1* | 3/2019 | Manor | H04L 41/0893 |
| 2019/0124144 A1 | 4/2019 | Isci et al. | |
| 2019/0140933 A1 | 5/2019 | Guim Bernat et al. | |
| 2019/0141593 A1 | 5/2019 | Wei et al. | |
| 2019/0164087 A1 | 5/2019 | Ghibril et al. | |
| 2019/0182741 A1 | 6/2019 | Oyman | |
| 2019/0190950 A1 | 6/2019 | Senecal et al. | |
| 2019/0260651 A1 | 8/2019 | Raney et al. | |
| 2019/0261197 A1 | 8/2019 | Bellamkonda et al. | |
| 2019/0313383 A1 | 10/2019 | Xiong et al. | |
| 2019/0387539 A1 | 12/2019 | Finkelstein | |
| 2020/0367083 A1 | 11/2020 | Hao et al. | |

FOREIGN PATENT DOCUMENTS

| | | | |
|---|---|---|---|
| IN | 201724036802 | A1 | 10/2018 |
| WO | 2009/149416 | A1 | 12/2009 |
| WO | 2015/184179 | A1 | 12/2015 |
| WO | 2017/128881 | A1 | 8/2017 |
| WO | 2017/221481 | A1 | 12/2017 |
| WO | 2018/009577 | A1 | 1/2018 |
| WO | 2018/031070 | A1 | 2/2018 |
| WO | 2018/037549 | A1 | 3/2018 |
| WO | 2018/089417 | A1 | 5/2018 |
| WO | 2018/135742 | A1 | 7/2018 |
| WO | 2018/154355 | A1 | 8/2018 |
| WO | 2018/215046 | A1 | 11/2018 |
| WO | 2019/055355 | A1 | 3/2019 |

OTHER PUBLICATIONS

Hayes, "The Intersection of HFC and 5G", © 2017 SCTE-ISBE, 14 pages.
Chang et al., "MEG architectural implications for LTE/LTE-A networks", Proceedings of the Workshop on Mobility in the Evolving Internet Architecture, ACM, 2016, http://www.eurecom.fr/fr/publication/4978/download/comsys-publi-4978.pdf, 6 pages.
Parvez et al., "A Survey on Low Latency Towards 5G: RAN, Core Network and Caching Solutions", IEEE Communications Surveys & Tutorials, vol. 20, No. 4, 2018, https://arxiv.org/pdf/1708.02562.pdf, 34 pages.
Chapman et al., "Low latency techniques for mobile backhaul over DOCSIS", IEEE Wireless Communications and Networking Conference (WCNC), 2018, https://booksc.xyz/book/70626190/56dd51, 6 pages.
Leddy C., "Cable's 5G Backhaul & Small Cell Prospects & Challenges", Light Reading, heavyreading.com, Oct. 2017, http://www.heavyreading.com/details.asp?sku_id=341O&skuitem_itemid=1739.
Al et al., "Edge computing technologies for Internet of Things: a primer", Digital Communications and Networks, vol. 4, 2018, pp. 77-86.
Dolui et al., "Comparison of Edge Computing Implementations: Fog Computing, Cloudlet and Mobile Edge Computing", IEEE, 2017, 6 pages.
Satyanarayanan et al., "The Case for VM-based Cloudlets in Mobile Computing", IEEE Pervasive Computing, Aug. 8, 2019 9 pages.
Notice of Allowance received for U.S. Appl. No. 16/421,944 dated Aug. 21, 2020, 35 pages.
Non-Final Office Action received for U.S. Appl. No. 17/016,804 dated Feb. 3, 2021, 33 pages.
Non-Final Office Action received for U.S. Appl. No. 17/095,002 dated Apr. 1, 2022, 51 pages.
Notice of Allowance received for U.S. Appl. No. 17/470,642 dated Sep. 16, 2022, 32 pages.

* cited by examiner

//<br>

DYNAMIC CLOUDLET FOG NODE DEPLOYMENT ARCHITECTURE

RELATED APPLICATIONS

The subject patent application is a continuation of, and claims priority to each of, U.S. patent application Ser. No. 17/095,002, filed Nov. 11, 2020, and entitled "DYNAMIC CLOUDLET FOG NODE DEPLOYMENT ARCHITECTURE," which is a continuation of U.S. patent application Ser. No. 16/421,944 (now U.S. Pat. No. 10,848,988), filed May 24, 2019, and entitled "DYNAMIC CLOUDLET FOG NODE DEPLOYMENT ARCHITECTURE," the entireties of which priority applications are hereby incorporated by reference herein.

TECHNICAL FIELD

The disclosed subject matter provides a dynamic on-demand cloudlet fog node deployment architecture in support of fifth generation (5G) Long Term Evolution (LTE) Internet of things (IoT) edge fog computing.

BACKGROUND

As the 5th generation (5G) Long Term Evolution paradigm comes to fruition, cable operators are expanding their fiber optic networks for macrosites and/or sites that will employ large swaths of bandwidth in the centimeter (cm) and/or millimeter (mm) waveband spectrum, as well as use a hybrid fiber coaxial (HFC) infrastructure to provide power, attachment, and/or connectivity (PAC) for cellular connectivity in legacy cellular radio spectra.

DETAILED DESCRIPTION

Figure 1:
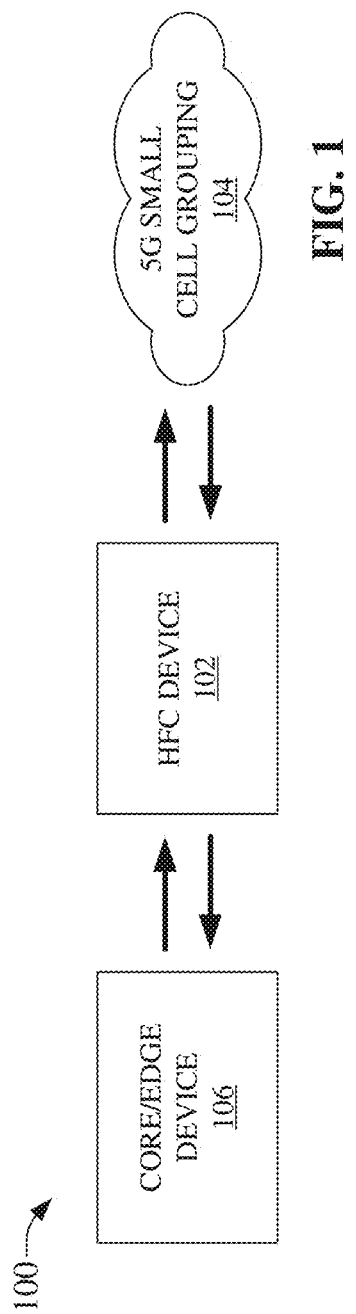
FIG. 1 is an illustration of a system for providing a dynamic cloudlet fog node deployment architecture, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed architecture provides an on-demand dynamic cloudlet instantiation by leveraging a grouping of software defined network (SDN) devices and their respective associated analytics modules (AMs). Each instantiation of an on-demand dynamic cloudlet can be a customization of one or more virtual (virtual machine (VM) based) cloudlet infrastructure by using SDN instructions executed by one or more SDN device of the grouping of SDN devices.

The fog aspect of the disclosed subject matter provides an assistive complementary cloud computing structure that ensures reliability in computing services and further ensures that quality of service (QoS) metrics are maintained at edge devices that can comprise a packet core network. Fog computing can provide an extension to cloud services at the edge of a grouping of Internet of things (IoT) devices to compete with and overcome the challenges of traditional core control (CC).

In accordance with various embodiments described herein, the disclosure provides that computing is pushed toward respected devices, either in the form of a device performing the computation itself, or by deploying a cloudlet in close proximity to a device such that the cloudlet acts as a miniature cloud, or a combination of both. The middle layer, e.g., the deployment of cloudlets in near proximity to a device wherein the cloudlet acts as a miniature cloud or a combination of both, can be considered as a "fog" comprising a plurality of cloudlets, wherein the cloudlets can be referred to as "fog nodes."

The cloud-fog-edge architecture can provide numerous benefits. A cloudlet can be perceived as a mobility-enhanced small-scale cloud datacenter that can be located at an edge of the Internet, and a cloudlet fog, as disclosed, can be thought of as virtualized computing nodes that can be facilitated by one or more 5G deep fiber hybrid fiber coaxial (HFC) device (e.g., hybrid fiber coaxial (HFC) 5th generation (5G) Long Term Evolution (LTE) small cell device). The main purpose of the HFC hosted cloudlet is to support resource-intensive and/or 5G supported interactive mobile applications by providing powerful computing resources to mobile devices with lower latency. A cloudlet can be viewed as basically a small-scale cloud that provides services similar to traditional cloud computing. However, unlike cloud computing that provides unlimited resources, the disclosed cloudlet generally only provides limited resources. Accordingly, the disclosed subject matter provides a transient customization (instantiation) of a VM. It should be noted, that the VM is transient in nature: pre-use customization and post-use cleanup ensures that the cloudlet infrastructure is restored to a pristine state after each use, without manual intervention. The logic of the transient deployment is typically dictated as a function of the SDN device that can have a close handshake relationship with the HFC device hosted/generated cloudlet fog.

The disclosed system and/or method is novel and unique as it emphasizes that the deployment of cloudlets comprising VMs are generated contemporaneously, are customized to cater to specific requirements/needs, and are transient once the need/requirement has been satisfied and/or fulfilled. The pre-use customization using one or more SDN instruction to generate one or more VM based cloudlet and a policy driven post-use cleanup of the VM based cloudlets (once the utility of each of the VM based cloudlets has been satisfied) ensures the entirety of the cloudlet infrastructure is not cluttered with unneeded/unnecessary cloudlet remnant/residuum. In this regard it should be noted that the post-use cleanup can be performed without manual intervention. A VM cleanly encapsulates and separates the transient guest (e.g., instantiated) software environment from the permanent host software environment of the cloudlet infrastructure. The interface between the permanent host software environment and the guest software environment, in accordance with various embodiments, can be configured to be narrow, stable, and/or ubiquitous. The encapsulation and separation of the transient guest software environment from the permanent host software environment of the cloudlet infrastructure ensures the longevity of cloudlet investments and greatly increases the chances of mobile user devices finding compatible cloudlets anywhere in the world. Malleable software interfaces of resource-rich mobile applications can be encapsulated within the instantiated guest software environment. Additionally, instantiated guest software environment can be precisely created (or re-created) during the pre-use customization of cloudlets. Consequently, a HFC node VM-based approach is less brittle than alternatives such as process migration or software virtualization.

In accordance with one or more various embodiments, an existing SDN AM can estimate potential traffic surges in a 5G cell site for a defined duration of time and based at least in part on the estimated potential traffic surges can dynamically satisfy the traffic surges in demand for service. For instance, for a first user equipment (UE) device in an idle state, the location of the first UE device can be determined in the 5G packet core network based at least in part on a defined and/or definable tracking area (TA) associated with the UE device. The defined and/or definable TA associated with the first UE device can also be used to predicatively forecast or predicatively determine sudden (and/or even gradual) increases and/or decreases in the numbers of disparate second UE devices (e.g., over a defined and/or definable time horizon (seconds, minutes, hours, days, etc.) that can enter and/or leave a broadcast/transmission umbrae/penumbrae cast by one or more cell site. In regard to predicatively determining sudden increases and/or sudden decreases (or gradual increases and/or gradual decreases) in the numbers of disparate second UE devices that can enter or leave the broadcast/transmission umbrae/penumbrae provided by a first cell site device (or one or more disparate second cell device(s)), this functionality and/or facility can be dynamically utilized when large events (sporting events, music concerts, parades, . . . ) are expected and/or scheduled, and/or when contemporaneously collected and/or collated crowd control data is received, for instance, via one or more audio/visual capture device (e.g., closed circuit camera devices, pressure sensor devices, microphone devices, transducer devices, seismographic devices, laser devices, photoelectric devices, body recognition devices, face recognition devices, gait recognition devices, and the like), and the crowd control data is analyzed using, for instance, one or more machine learning process, one or more artificial intelligence process, one or more collaborative filtering process, etc. to predict, for example, the commencement of: flash mobs, impromptu demonstrations, imminent riots, disturbances of the peace, and the like.

In regard to predicatively forecasting or predicatively determining the sudden (and/or even gradual) increases and/or decreases in the numbers of disparate second UE devices that, over a defined and/or definable time duration can potentially enter and/or potentially leave (and/or predicatively can have entered and/or predicatively can have left) a broadcast/transmission coverage area cast by one or more cell site; one or more alert and/or one or more notification can be directed or conveyed to a SDN device(s) regarding a surge of potential expected arrivals to, and/or a diminution of potential expected departures from, the coverage area associated with the one or more cell site. The SDN device, based on, in response to, and/or as a function of the received notification(s) or the received alert(s) can marshal access resources to accommodate the surge of potential expected arrivals of UE devices into the coverage area associated with the one or more cell site, can decrease the allocation of access resources in the event of a prospective diminution of the potential expected departures of UE devices from the coverage area associated with the one or more cell site. Additionally and/or alternatively, the SDN device, based on, in response to, and/or as a function of the obtained notification(s) or obtained alert(s) can reduce the allocation of access resources in instances where there is a significant diminution of expected arrivals of UE devices into the coverage area associated with one or more cell sites, or significant increase in the numbers of departures of UE devices from the transmission coverage area(s) afforded by the cell site(s).

In accordance with various aspects, the SDN device situated, for example, in a packet core network associated with a mobile network operator entity, and in collaboration with a HFC device positioned, for instance, within a HFC infrastructure/environment, can generate and distribute individuated cloudlets to form a cloudlet fog in proximity to the UE devices. Each individuated cloudlet comprising the cloudlet fog can be associated with a unique UE device. Thus, a first generated cloudlet within the generated fog can be associated and/or service a first UE device, a second generated cloudlet within the generated fog can be associated and/or service a second UE device, wherein the first UE device and the second UE device are distinct devices.

Additionally, and/or alternatively, a first generated cloudlet within the generated cloudlet fog can service a cluster of UE devices, wherein the cluster of UE devices can comprise a grouping of disparate UE devices, and wherein the grouping can be determined based on one or more common characteristic associated with UE devices that form the grouping. For instance, a first grouping of UE devices can be determined based on one or more commonality of QoS criteria. In a further instance, a second grouping of UE devices can be determined as a function of a commonality of global positioning satellite (GPS) coordinate with respect to one or more other UE devices within the group and/or in relation of one or more serving base station cell device(s) or one or more access point cell device(s).

In additional instances, a third grouping of UE devices can be determined based at least in part on a relative ranking/ordering of QoS criteria, wherein, for example, one or more of the QoS criteria (e.g., packet loss data, bit rate data, throughput data, transmission delay data, availability data, data relating to deviations from a time periodicity from a periodic signal determined in relation to a reference clock signal (e.g., jitter data), service response time data, signal-to-noise ratio (SNR) data, crosstalk data, echo data, interrupt data, frequency response data, loudness level data, and the like) can be individually and/or collectively ranked in a relative ordering. For instance, for UE devices that are executing time sensitive streaming applications, packet loss can be deleterious to the smooth functioning of the application, thus these UE devices can be grouped with other similar UE devices into a grouping of UE devices that can in turn be serviced by one or more cloudlet, wherein the one or more cloudlet can be customized or configured to prioritize the minimization of packet loss based on packet loss metrics.

In order to facilitate the foregoing functionalities and/or facilities, the disclosure provides a core/edge device located within and associated with a long term evolution (LTE) packet core network operated by a mobile network operator entity. The core/edge device in various embodiments can be in operative communication with a HFC device that can be situated within a HFC infrastructure environment, wherein the HFC device can provide deep fiber HFC support for 5G densification. In various embodiments, the HFC device can be associated with a local agent process and/or a local agent component that can be in wired and/or wireless correspondence with the core/edge device. The HFC device, through the local agent process and/or the local agent component, can also be in wired and/or wireless communication with one or more UE devices. In one or more embodiments the HFC device situated within the HFC infrastructure environment can be in operative communication with a SDN device that can be situated in some instances within the LTE packet core network. In other alternate embodiments, the HFC device can be in communication with the SDN device that can be located within the HFC infrastructure environment. For ease of exposition however and without limitation or loss of generality, the SDN device can be situated within the LTE packet core network and can be in correspondence with the HFC device situated within the HFC infrastructure.

The disclosed systems and methods, in accordance with various embodiments, provide a system, apparatus, or device comprising: a processor, and a memory that stores executable instructions that, when executed by the processor, facilitate performance of operations. The operations can comprise receiving, from a mobile edge device, a predictive policy rule representing a predictive policy to facilitate an instantiation of a dynamic on-demand cloudlet node into a fog comprising a group of instantiated dynamic on-demand nodes; and determining, as a function of the predictive policy, that a traffic surge has occurred with respect to a small cell device of a grouping of small cell devices, wherein the grouping of small cell devices are configured to operate according to at least a fifth generation wireless network protocol; and in response to the determining that the traffic has occurred with respect to the small cell device, instantiating the dynamic on-demand cloudlet node into the fog.

Additional operations can comprise customizing the dynamic on-demand cloudlet node based on a quality of service metric representative of quality of service associated with the small cell device, and wherein in the quality of service metric is usable, by the mobile edge device, to generate the predictive policy rule; determining that the traffic surge has occurred as a function of a threshold crossing alarm being triggered; determining that the threshold crossing alarm has been triggered as a function of determining that a threshold value associated with a quality of service metric representative of a quality of service of the small cell device has not been exceeded; and determining that the threshold crossing alarm has been trigged in response to determining that a threshold value associated with a quality of service metric representative of a quality of service of the grouping of small cell devices has been exceeded.

Further operations can include customizing the dynamic on-demand cloudlet node to facilitate execution of a software defined network instruction by the instantiation of the dynamic on-demand cloudlet node, wherein execution of the software defined network instruction by the instantiation of the dynamic on-demand cloudlet node facilitates a reduction of a transmission power level associated with the small cell device; and wherein the operations further comprise determining, based on the predictive policy rule, that a functionality associated with the instantiation of the dynamic on-demand cloudlet node has been achieved. Additional operations can include removing, based on the predictive policy rule and a determination that the functionality associated with the instantiation of the dynamic on-demand cloudlet node has been achieved, the instantiation of the dynamic on-demand cloudlet node from the fog.

In accordance with further embodiments, the subject disclosure describes a method and/or process, comprising a series of acts that, for example, can include: receiving, by a device comprising a processor, quality of service data representing a quality of service metric associated with a small cell device of a group of small cell devices, wherein the group of small cell devices are configured to operate according to a fifth generation wireless network protocol; generating, by the device, a policy rule representing a predictive policy to facilitate an instantiation of a dynamic on-demand cloudlet node into a fog of dynamic on-demand cloudlet node instantiations; and facilitating, by the device, the instantiation of the dynamic on-demand cloudlet node into the fog, by a hybrid fiber coaxial device, based on the policy rule and an indication received from the hybrid fiber coaxial that a traffic surge in communications with the small cell device has occurred.

In accordance with various embodiments, the instantiation of the dynamic on-demand cloudlet node can be customized based on an attribute associated with the quality of service metric associated with the small cell device; the instantiation of the dynamic on-demand cloudlet node can change or modify an operational parameter of the small cell device by adjusting an azimuth value associated with an antenna of the small cell device; the instantiation of the dynamic on-demand cloudlet node can modify or change an operation parameter of the small cell device by changing or adjusting a broadcast power value associated with transmission power used by the small cell device to transmit data packets within the group of small cell devices.

Further in accordance with additional embodiments, where the group of small cell devices is a first group of small cell devices, the first group of small cell devices and a second group of small cell devices can be geographically proximate to each other. Additionally, where the group of small cell devices is a first group of small cell devices, the first group of small cell devices and a second group of small cell device are geographically remote from each other.

In regard to the foregoing, where the small cell device is a first small cell device, the instantiation of the dynamic on-demand cloudlet node is a first instantiation of a first dynamic on-demand cloudlet node customized for the first small cell device, the facilitating can further comprise instantiating a second instantiation of a second dynamic on-demand cloudlet node customized for a second small cell device, wherein the second instantiation of the second dynamic on-demand cloudlet node into the fog can be based on a commonality of the policy rule between the first small cell device and the second small cell device.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can include: receiving, from an edge device, a policy rule representing a predictive policy to facilitate an instantiation of a dynamic on-demand cloudlet node into a fog of instantiated dynamic on-demand nodes; and determining, as a function of the policy, that a communication overflow has occurred with respect to a small cell device of a grouping of small cell devices, wherein the grouping of small cell devices are configured to operate according to at least a fifth generation wireless network protocol; and based on determining that the communication overflow has occurred, instantiating the dynamic on-demand cloudlet node into the fog.

When the 5G small cell device is a first small cell device, the grouping of small cell devices is a first grouping of small cell devices, and the predictive policy can be determined based on a first quality of service metric received from the first small cell device and a second quality of service metric received from a second small cell device of a second grouping of small cell devices. In this instance, the first grouping of small cell devices can be geographically remote from the second grouping of small cell devices, and/or the first 5G small cell device can be geographically proximate to the second small cell device.

Now with reference to the Figures, FIG. 1 illustrates a system 100 for the provision of a dynamic cloudlet fog node deployment architecture, in accordance with various embodiments. The system 100 can comprise hybrid fiber coaxial (HFC) device 102 that can be in operable communication (e.g., wireless and/or wired communication) with a 5G small cell grouping 104 (e.g., a collection of 5G small cell devices and/or a grouping of various LTE UE devices) and core/edge device 106. HFC device 102 can be a device that is situated, in accordance with various embodiments, within a HFC infrastructure/environment. HFC device 102, in accordance with additional and/or alternative embodiments, can also be located external to, and interfacing with, a HFC infrastructure/environment. Nevertheless, for purposes of clarity of exposition, HFC device 102 in this instance is described as being located within a HFC infrastructure/environment.

HFC device 102, in accordance with various embodiments, can execute one or more mobile edge computing processes to collect quality of service (QoS) data/metrics in regard to the collection of 5G small cell devices 104. The QoS data/metrics can comprise packet loss data, bit rate data, throughput data, transmission delay data, availability data, data relating to deviations from a time periodicity from a periodic signal determined in relation to a reference clock signal (e.g., jitter data), service response time data, signal-to-noise ratio (SNR) data, crosstalk data, echo data, interrupt data, frequency response data, loudness level data, and the like. The QoS data/metrics can be collected, by HFC device 102, for each small cell device that can comprise the collection of 5G small cell devices 104.

In accordance with various embodiments, HFC device 102, at defined and/or definable time intervals, can facilitate each of the small cell devices that comprise the collection of 5G small cell devices 104 to respond to a directive issued by HFC device 102 to the small cell device to respond with their respective QoS data/metrics. In an additional and/or alternative embodiments, HFC device 102 can passively wait for each small cell device comprising the collection of 5G small cell devices 104 to periodically (e.g., at randomly determined time intervals) send their respective QoS data/metrics. In accordance with further embodiments, the periodicity with which each small cell device comprising the collection of 5G small cell devices 104 can dispatch its QoS data/metrics can be determined as deviation (upward or downward) from a defined or definable threshold value associated with each QoS metric (or a combination of QoS metric). Thus for example, a small cell device (e.g., a small form factor device and/or one or more UE device) of the collection of 5G small cell devices 104 can transmit to HFC device 102 QoS data/metrics when the small cell device determines that a value associated with packet loss data has exceeded a threshold value associated with packet loss—can be indicative that the small cell device is approaching a state of distress and/or that the underlying network that forms the collection of 5G small cell devices 104 is congested. Similarly, a small cell device of the collection of 5G small cell devices 104 can transmit its QoS data/metrics when the small cell device determines that a value associated with interrupt data has fallen below a threshold value associated with interrupt data—can be indicative that the transmission of the QoS data/metrics will not be a major hindrance to the network that can underpin the collection of 5G small cell devices 104.

In further additional and/or alternative embodiments, HFC device 102 (and/or the one or more mobile edge computing services operating/executing on HFC device 102) based on, as a function of, or in response to QoS metric data that can have been received from one or more of the small cell devices that can comprise the collection of 5G small cell devices 104 can respectively (or collectively) direct each small device to return their QoS data/metrics to HFC device 102. In accordance with this aspect, HFC device 102 can use one or more of machine learning techniques, artificial intelligence processes, neural network technologies, and the like to perform a cost/benefit analysis in regard to whether or not it is beneficial (or practicable) to cause the one or more small cell devices comprising the collection of 5G small cell devices 104 to return their respective QoS data/metrics at a particular instance of time.

HFC device 102, in response to receiving QoS data/metrics from the various small cell devices associated with the collection of 5G small cell devices 104, can collate/order/rank the QoS data/metrics, based for example, on a selection of the small cell devices. In accordance with embodiments, the ordering/ranking of the QoS data/metrics can be performed as a function, for example, of SNR data that can have been included by each of the small cell devices. In accordance with additional and/or alternative embodiments, the ordering/ranking can be performed based on two or more QoS data/metrics, for instance, jitter data and service response time data that can have been received from each of the small cell devices that can comprise the collection of 5G small cell devices 104.

Further, HFC device 102 can also facilitate a small cell device included in the collection of 5G small cell devices 104 to adjust one or more of its broadcast characteristics based on the QoS data that the small cell device can have fed back to HFC device 102. For example, in accord with various embodiments HFC device 102, based at least on first QoS data/metrics sent by a first small cell device included in the collection of 5G small cell devices 104, can cause the first small cell device to adjust its broadcast power level. Additionally and/alternatively, HFC device 102, in response to respective QoS data/metrics received from a second small cell device and a third small cell device, can respectively cause the second small cell device to adjust its broadcast power level, and can cause the third small cell device to adjust one or more of its associated antennae azimuths. In this manner HFC device 102 can allow multiple small cell devices to coexist within the collective of 5G small cell devices 104 without unnecessary contention between each of the 5G small cell devices, which in turn can lead to greater small cell densities and/or small cell granularities within confined areas, a greater number of IoT end user devices being able to be operational and/or supported by the collection of 5G small cell devices 104, etc.

HFC device 102 can be any type of mechanism, machine, device, facility, and/or instrument that includes a processor and/or is capable of effective and/or operative communication with a network topology. Mechanisms, machines, devices, facilities, and/or instruments that can comprise HFC device 102 can include tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for instance, orbiting satellites and/or associated aeronautical vehicles, and the like.

5G small cell grouping 104 can comprise a grouping of small cell devices, such as access point devices, base station devices, eNodeB devices, femtocell devices, picocell devices, microcell devices, small form factor (SFF) devices, and the like. Generally, small cell devices can be low power, short range wireless transmission devices covering small indoor/outdoor geographic areas. Small cell devices can, for example, have transmission coverage areas that are less than 10 meters (m) to in excess of 2.5 kilometers (KM). Further, small cell devices can have broadcast power ratings of less than 100 milliwatts (mW) to over 5 watts (W), and can support over 200 simultaneous users. Thus, small cell devices can have all the functionalities and/or facilities of conventional base station devices, and further can be capable of handling high data rates for individual users.

In 5G deployments, small cell devices can provide efficient delivery of high speed mobile broadband and other low latency applications. Under the 5G paradigm, small cell devices can be designed to provide high speed mobile broadband connections that can exceed a few gigabytes per second rate; and can provide an ultra robust, reliable, low latency smart network (e.g., less than a millisecond latency) suitable for mission critical applications. Additionally, since the Internet of Things (IoT) can comprise a significant number of devices (e.g., in the hundreds of millions or billions), such as smart sensor devices (e.g., smart thermostats, smart home security devices, proximity devices, healthcare monitors, . . . ), the need for the functionalities, capabilities, and/or facilities provided by small cell devices to handle such massive data interchange between IoT devices can be overwhelmingly indubitable, and further illustrates that there currently is an unmet need for ongoing and continuous small cell device maintenance, monitoring, and/or management in order to effectively and efficiently had such data flows.

As noted earlier, 5G small cell grouping 104 can comprise a collection of small cell devices (e.g., access point devices, base station devices, eNodeB devices, femtocell devices, picocell devices, microcell devices, small form factor (SFF) devices, . . . ). Each of the small cell device included in 5G small cell grouping 104 can be one or more type of mechanism, machine, device, facility, and/or instrumentality that includes a processor and/or is capable of effective and/or operative communication with a network topology. Mechanisms, machines, devices, facilities, and/or instrumentalities that can comprise a small cell device can include handheld devices, tablet computing devices, server class computing machines and/or databases, laptop computers, notebook computers, desktop computers, cell phones, smart phones, consumer appliances and/or instrumentation, commercial appliances and/or instrumentation, industrial devices and/or components, personal digital assistants, multimedia Internet enabled phones, multimedia Internet enabled devices, multimedia players, aeronautical/avionic devices associated with, for example, orbiting satellites and/or associated aeronautical vehicles, and the like.

Also illustrated in FIG. 1 is core/edge device 106 that can be in operative (e.g., wired and/or wireless) communication with HFC device 102. In accordance with various embodiments, core/edge device 106 can be situated within the wider core infrastructure of a mobile network operator (MNO) carrier. For example, core/edge device 106 can be located at the core of the MNO infrastructure (e.g., a core device). Additionally and/or alternatively, core/edge device 106 can be situated at an edge of the MNO infrastructure (e.g., an edge device). Further, in accordance with embodiments, core/edge device 106 can be positioned externally to the HFC infrastructure within which HFC device 102 can have been sited. Alternatively and/or additionally, core/edge device 106 can be placed within the HFC infrastructure such that core/edge device 106 interfaces with one or more devices of a grouping of devices associated with various implementations of the Long Term Evolution (LTE) paradigm such as: 3G LTE, 4G LTE, LTE Advanced, 5G, and the like. Illustrative devices of this grouping of devices can include core base station devices, edge base station devices, database server devices associated with the base station devices and/or edge base station devices.

Core/edge device 106 can receive raw QoS data/metrics, via HFC device 102 (e.g., wherein HFC device 102 acts as a pass-through device) for each respective small cell device that can comprise collection of 5G small cell devices 104, and/or core/edge device 106 can receive pre-processed QoS data/metrics from HFC device 102 (e.g., wherein HFC device 102 acts as a staging device and/or performs preliminary processing on the QoS data/metrics for each of the small cell device that can be included in the collection of 5G small cell devices 104 prior to forwarding the pre-processed QoS data/metrics to core/edge device 106).

Core/edge device 106, in response to receiving the QoS data/metrics (e.g., raw QoS data/metrics and/or pre-processed QoS data/metrics) can store the received QoS data/metrics to a database device of a group of database devices, and thereafter can perform processing on the received QoS data/metrics. Core/edge device 106 can perform processing of the recently received QoS data/metrics in conjunction with additional QoS data/metrics that can have been stored to the database device in regard to each device (e.g., small cell devices and/or one or more devices associated with the IoT) included in the collection of 5G small cell devices 104, as well as QoS data/metrics that can have been received from additional disparate collections of 5G small cell devices that can be situated geographically proximate to the collection of 5G small cell device 104, and/or QoS data/metrics that can have been received from additional disparate collections of 5G small cell devices that can be positioned at geographically remote locations with respect to the collection of 5G small cell device 104.

Core/edge device 106, based on the processing performed on the recently received QoS data/metrics, the additional QoS data/metrics that can have been stored to database devices of groupings of database devices in the context of each device (e.g., small cell devices and/or one or more devices associated with the IoT) included in the collection of 5G small cell devices 104, and/or the QoS data metrics that can have been received within a defined and/or definable period of time in regard to disparate and/or alternative geographically proximate (e.g., abutting, contiguous, adjoining, bordering, . . . ) and/or situationally distant (e.g., peripheral, remote, . . . ) collections of 5G small cell devices, can determine and/or generate one or more value that can be used by core/edge device 106 to facilitate one or more adjustment in operation of one or more small cell device included in the collection of 5G small cell devices 104. Typically, the one or more values that facilitate adjustment operations on the one or more small cell devices included in the collection of 5G small cell devices 104 can be directed to the one or more small cell devices via mobile edge computing facilities and/or functionalities associated with HFC device 102. Further, the one or more values determined and/or generated by core/edge device 106 can relate to transmission or broadcast parameters associated with, for example, transmission/broadcast power, antenna settings, and the like. These adjustment operations that can be facilitated by core/edge device 106, via HFC device 102, can be necessitated because one or more of the small cell devices included in the collection of 5G small cell devices 104 is impinging upon a disparate abutting or adjacent collection of 5G small cell devices.

As illustrated in FIG. 1 and noted earlier, HFC device 102 can collect, collate, cluster, and/or classify (e.g., provide a classifying ranking or ordering, in response to for example, an importance value that can be determined based on one or more defined or definable threshold values being met and exceed or not being met and not surpassed) various data from each device included in collection of 5G small cell devices 104 and in response to, based on, and/or as a function of the received data can filter and/or detect (or determine) one or more threshold crossing alert/alarm (TCA) events. For instance, in various embodiments, a TCA event can be determined as a function of unexpected (or predicted) surge in 5G cell site traffic determined over a first defined duration of time and the determined value equaling or exceeding a threshold value. In alternative embodiments, a TCA event can be determined based on expected (or predicted) diminutions in 5G cell site traffic determined over a second defined duration of time and the determined value equaling but not surpassing a threshold value.

HFC device 102 can also perform preprocessing of the received data and can forward the received data as well as the processed data (e.g., subsequent to performance of the preprocessing by HFC device 102) to core/edge device 106. It should be noted that in some embodiments, HFC device 102 can forward the received data directly to core/edge device 106 prior to performing preprocessing on the received data, in effect operating as a pass through device in this instance, and shortly thereafter (e.g., once performance of preprocessing had completed) send the preprocessed data to core/edge device 106. In additional and/or alternative embodiments, HFC device 102 can contemporaneously send the received data (e.g., raw data received from one or more 5G small cell device comprising the collection of 5G small cell devices 104) and the preprocessed data to core/edge device 106.

Core/edge device 106 can perform data analytics (e.g., execute one or more mobile edge computing processes) on the data received from HFC device 102, and as a function of, or based on, the result(s) of the data analytics can define, generate, and/or establish one or more predictive policy rules for HFC device 102 to implement in the context of 5G small cell grouping 104. Core/edge device 106 can thereafter return the predictive policy rules to HFC device 102 for subsequent implementation, for example, to ameliorate a determined surge or a determined diminution by allocating additional access resources, or reallocating access resources to serve and fulfill disparate other purposes.

In regard to the performance of data analytics, core/edge device 106 can use data that can have been received from disparate other HFC devices with which core/edge device 106 can be in communication. Further, core/edge device 106 can also source and marshal data for purposes of data analytics from, for example, a database device of a networked grouping of database devices, wherein the networked grouping of database devices can be associated with a mobile network operator entity. As will be appreciated by those having ordinary skill in the art the sourcing of data for purposes of data analytics can be limitless, disparate, and varied. It is thus to be appreciated that these varied and disparate sources of data are contemplated to be within the purview of the disclosed and described subject matter.

HFC device 102, based on the predictive policy rules determined and generated by core/edge device 106 and data (e.g., QoS metrics) received from 5G small cell grouping 104, can detect a traffic surge (or traffic diminution) that can be occurring in 5G small cell grouping 104 and in response to detecting the traffic surge can notify core/edge device 106. Core/edge device 106, in response to receiving the notification or the traffic surge from HFC device 102, can direct HFC device 102 to initiate deployment of one or more on-demand cloudlet instantiation into a cloudlet fog comprising on-demand instantiated cloudlet instantiations.

As has been noted above, each on-demand dynamic cloudlet can be a specific defined and individuated customization of one or more VM based cloudlet infrastructure using SDN instructions, execution of which can be, facilitated by one or more core/edge device 106 of a grouping of core/edge devices and/or HFC device 102. Further, as has also been noted above, the one or more on-demand dynamic cloudlet can be ephemeral in nature as the existence of on-demand dynamic cloudlet typically will only last for the duration for which the traffic surge (or any event of note) is deemed to exist. Once the traffic surge is deemed to no longer exist, the on-demand dynamic cloudlet can disappear as if it had never existed.

It should be noted in the context of the cloudlet fog comprising on-demand instantiated cloudlet instantiations, that the cloudlet fog is also transient in nature, as ab initio when the described system 100 is initiated (e.g., setup) there can have been no instantiations of on-demand dynamic cloudlets and the cloudlet fog cannot not have an existence. Accordingly, the genesis of the cloudlet fog can commence with the instantiation of a first on-demand dynamic cloudlet. Conversely, the demise of the cloudlet fog can occur when the last instantiated on-demand dynamic cloudlet comprising the cloudlet fog ceases to be operational and have utility. Nevertheless, it should be appreciated that when a cloudlet fog has ceased to have existence, the cloudlet fog can nevertheless be reinitialized and re-established, and can be brought into existence on the instantiation of an on-demand dynamic cloudlet.

HFC device 102 and/or core/edge device 106 can facilitate dynamic on-demand cloudlet customization and/or instantiation based SDN instructions that can be received from core/edge device 106 and/or a device of grouping of devices that can have the functionalities and facilities to supply SDN instructions for the purpose of dynamic on-demand cloudlet customization and/or instantiation. The SDN instructions in accordance with various embodiments can facilitate deployment of customized dynamic on-demand cloudlets into a fog of instantiated dynamic on-demand cloudlets. As has been noted above, each of the dynamic on-demand cloudlets can be instantiated and customized for a unique and specific purpose associated with at least one 5G small cell device that can comprise 5G small cell grouping 104. In accordance with various embodiments, each 5G small cell device can be associated with a customized dynamic on-demand cloudlet (e.g., the dynamic on-demand cloudlet can have been adapted and/or configured specifically for the 5G small cell device). In accordance with these embodiments, when the 5G small cell device exits 5G small cell grouping 104 (e.g., is powered down) the instantiation of the customized dynamic on-demand cloudlet specifically associated the 5G small cell device can disappear, without trace (e.g., as if the customized dynamic on-demand cloudlet instantiation had never existed), from the fog of instantiated dynamic on-demand cloudlets. In accordance with various other embodiments, a 5G small cell device can be associated with more than one instantiated and customized dynamic on-demand cloudlet (e.g., the dynamic on-demand cloudlet can have been adapted and/or configured for disparate unique purposes for the 5G small cell device based, for instance, on a multiplicity of diverse, but unique, QoS criteria). In accordance with these other various embodiments, the customized dynamic on-demand cloudlet instantiation can cease existence when the 5G small cell device, for example, ceases operation. In accordance with yet further embodiments, a 5G small cell device can be associated with a cloudlet instantiated and customized to service a collection of multiple 5G small cell devices based, for example, on a shared commonality of QoS metric. In accordance with these further embodiments, since the 5G small cell device is associated with a collection of 5G small cell devices, the instantiated on-demand cloudlet can have a persistence until the last 5G small cell device of the collection of 5G small cell device has no further use for the instantiated customized dynamic on-demand cloudlet.

While the fog of instantiated cloudlets is in existence, and while each cloudlet with the fog is operational and has utility with respect to a 5G small cell device within the 5G small cell grouping 104, HFC device 102 can be in continuous and/or operable communication with core/edge device 106 on which the facilities and/or functionalities for the SDN aspects can be hosted; HFC device 102 can continuously supply data related to traffic conditions that can be affecting the 5G small cell grouping 102 as a whole, and/or traffic conditions that can be affecting individual 5G small cell devices that have been associated with one or more instantiated customized dynamic on-demand cloudlet instantiation. Once the purpose for which a particular customized dynamic on-demand cloudlet instantiation has been satisfied, the SDN aspects in collaboration with core/edge device 106 and/or HFC device 102 can facilitate cleanup of the instantiated customized dynamic on-demand cloudlet instantiation. As has been noted extensively in this description, each instantiated customized dynamic on-demand cloudlet instance is ephemeral in nature and once the utility associated with the cloudlet instance has been fulfilled the cloudlet instance, in accord with the pre-use customization and the established policy, is cleaned up to ensure that the cloudlet infrastructure is restored to its pristine software state after each use, without manual intervention.

Figure 2:
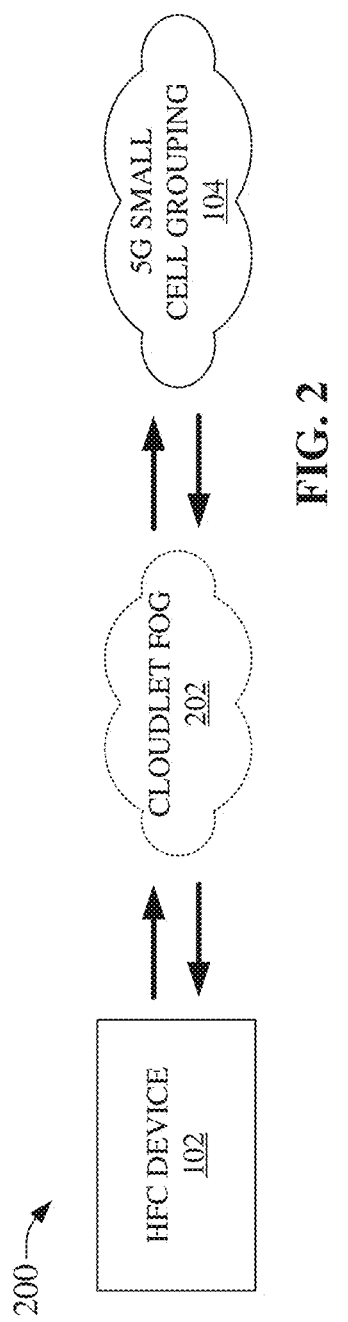
FIG. 2 is a further depiction of a system for the provision of a dynamic cloudlet fog node deployment architecture, in accordance with aspects of the subject disclosure.

With reference to FIG. 2, illustrated therein is a system 200 for providing for a dynamic cloudlet fog node deployment architecture, in accordance with one or more embodiments. System 200 can include HFC device 102 and 5G small cell grouping 104. As has been noted earlier, HFC device 102, in accordance with embodiments, can be positioned within a HFC infrastructure. Further, as also noted, HFC device 102, in accordance with other embodiments, can be located external to, but nevertheless interfacing with, the HFC infrastructure. Nonetheless, for purposes of simplicity of description, HFC device 102 can be situated within a HFC infrastructure environment.

HFC device 102, as depicted, can facilitate creation and maintenance of cloudlet fog 202, based at least in part on the predictive policy rules determined and generated by a core/edge device (e.g., core/edge device 106) and data (e.g., QoS metrics) received from 5G small cell grouping 104. HFC device 102, for example, can detect a traffic surge (or traffic diminution) that can be occurring in 5G small cell grouping 104 and in response to detecting the traffic surge can notify the core/edge device. The core/edge device, in response to receiving the notification of the traffic surge from HFC device 102, can direct HFC device 102 to initiate deployment of one or more on-demand cloudlet instantiation into cloudlet fog 202.

As has been noted above, each on-demand dynamic cloudlet can be a specific defined and individuated customization of one or more VM based cloudlet infrastructure using SDN instructions, execution of which can be, facilitated by one or more core/edge device of a grouping of core/edge devices and/or HFC device 102. Further, as has also been noted above, the one or more on-demand dynamic cloudlet can be ephemeral in nature as the existence of on-demand dynamic cloudlet typically will only last for the duration for which the traffic surge (or any event of note) is deemed to exist. Once the traffic surge is deemed to no longer exist, the on-demand dynamic cloudlet can disappear as if it had never existed.

With regard to cloudlet fog 202 comprising on-demand instantiated cloudlet instantiations, cloudlet fog 202 is also transient in nature, as ab initio when the described system 200 is initiated there can have been no instantiations of on-demand dynamic cloudlets and cloudlet fog 202 cannot not have an existence. Accordingly, the genesis of the cloudlet fog 202 can commence with the instantiation of a first on-demand dynamic cloudlet. Conversely, the demise of cloudlet fog 202 can occur when the last instantiated on-demand dynamic cloudlet comprising the cloudlet fog ceases to be operational and have utility. Nevertheless, it should be appreciated that when cloudlet fog 202 has ceased to have existence, cloudlet fog 202 can nevertheless be reinitialized and re-established, and can be brought back into existence on the instantiation of at least one on-demand dynamic cloudlet.

Figure 3:
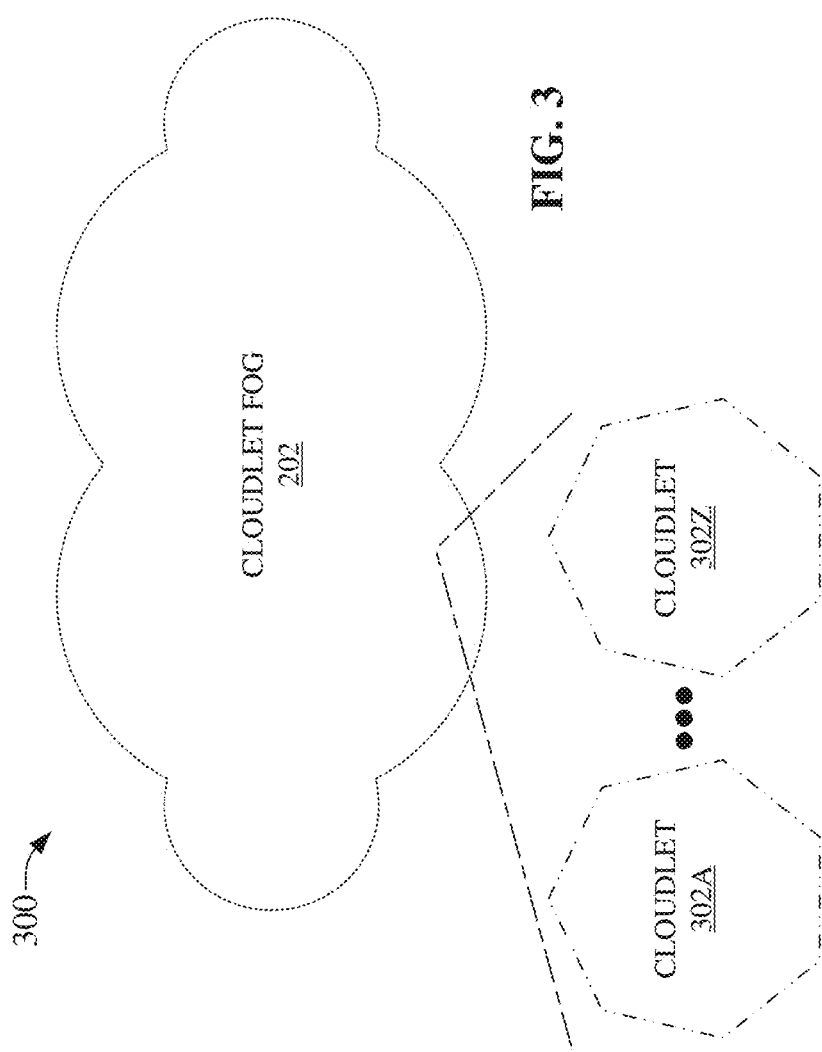
FIG. 3 provides illustration of an additional system for the provision of a dynamic cloudlet fog node deployment architecture, in accordance with aspects of the subject disclosure.

FIG. 3 provides additional illustration 300 of cloudlet fog 202 in accordance with various disclosed embodiments. As depicted cloudlet fog 202 can comprise one or more on-demand instantiated cloudlet instantiation (e.g., cloudlet 302A cloudlet 302Z). Each on-demand dynamic cloudlet 302A . . . cloudlet 302Z can be a specific defined and individuated customization of one or more VM based cloudlet infrastructure using SDN instructions, execution of which can be, facilitated by one or more core/edge device of a grouping of core/edge devices and/or a HFC device. Further, as has also been noted above, the one or more on-demand dynamic cloudlet 302A . . . cloudlet 302Z can be ephemeral in nature as the existence of on-demand dynamic cloudlet 302A . . . cloudlet 302Z typically will only last for the duration for which a traffic surge (or any event of note) is deemed to exist. Once the traffic surge is deemed to no longer exist, one or more of the on-demand dynamic cloudlet 302A . . . cloudlet 302Z can disappear as if it had never existed.

It should be noted in the context of the cloudlet fog 202, that the cloudlet fog 202 can also be of transient in nature, as ab initio when the described system is initiated (e.g., setup) there can have been no instantiations of on-demand dynamic cloudlet 302A . . . cloudlet 302Z and the cloudlet fog 202 cannot not have an existence. Accordingly, the genesis of the cloudlet fog 202 can commence with the instantiation of a first on-demand dynamic cloudlet (e.g., cloudlet 302A). Conversely, the demise of the cloudlet fog 202 can occur when the last instantiated on-demand dynamic cloudlet (e.g., cloudlet 302Z) comprising the cloudlet fog 202 ceases to be operational and have relevance. Nevertheless, it should be appreciated that when a cloudlet fog 202 has ceased to have existence, cloudlet fog 202 can nevertheless be re-instantiated and reconstituted, and can be brought back into existence on an instantiation of an on-demand dynamic cloudlet 302A . . . cloudlet 302Z.

Figure 4:
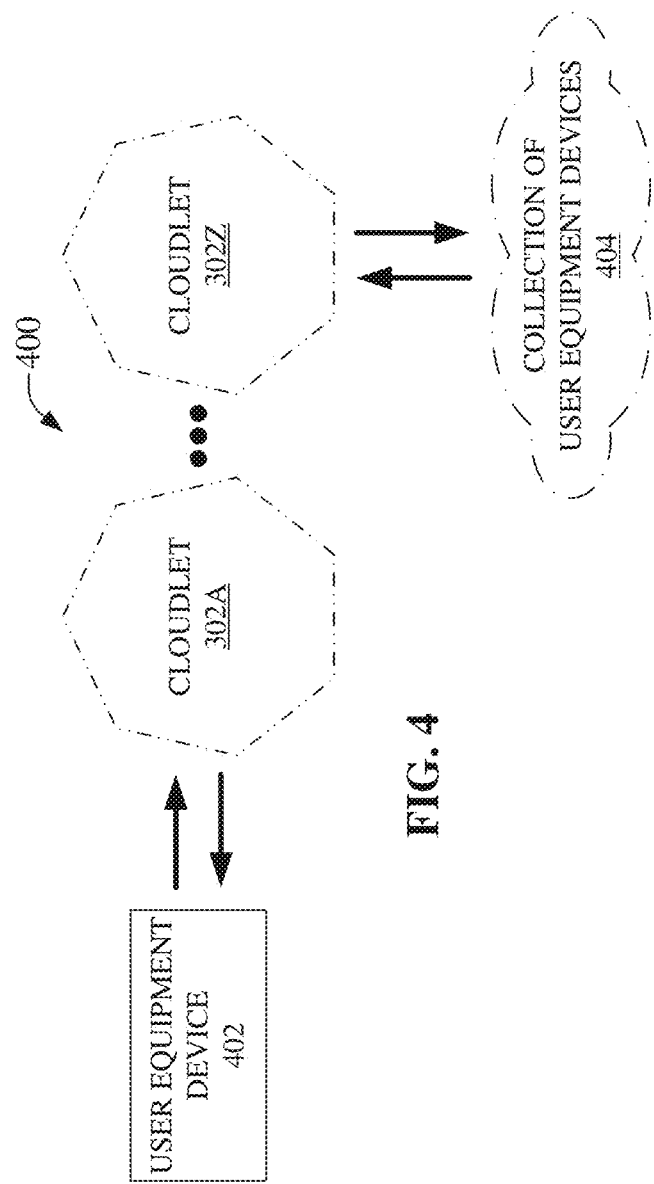
FIG. 4 provides another illustration of a system for the provision of a dynamic cloudlet fog node deployment architecture, in accordance with aspects of the subject disclosure.

FIG. 4 provides additional depiction 400 of cloudlet 302A . . . cloudlet 302Z, wherein cloudlet 302A can be associated with UE device 402 that can be a 5G small cell device included in a 5G small cell grouping (e.g., 5G small cell grouping 104). In this instance, cloudlet 302A can be an instantiation of an on-demand dynamic cloudlet that has been customized specifically to service the needs of UE device 402. Further, as illustrated, cloudlet 302Z can be associated with a collection of user equipment devices 404, wherein the collection of UE devices 404 can comprise a grouping of disparate 5G small cell devices, and wherein the grouping can be determined, for example, based on one or more common characteristic associated with UE devices that form the collection of user equipment devices 404. For instance, a first grouping of UE devices can be determined based on one or more commonality of QoS criteria. In a further instance, a second grouping of UE devices can be determined as a function of a commonality of global positioning satellite (GPS) coordinate with respect to one or more other UE devices within the group and/or in relation of one or more serving base station cell device(s) or one or more access point cell device(s).

Figure 5:
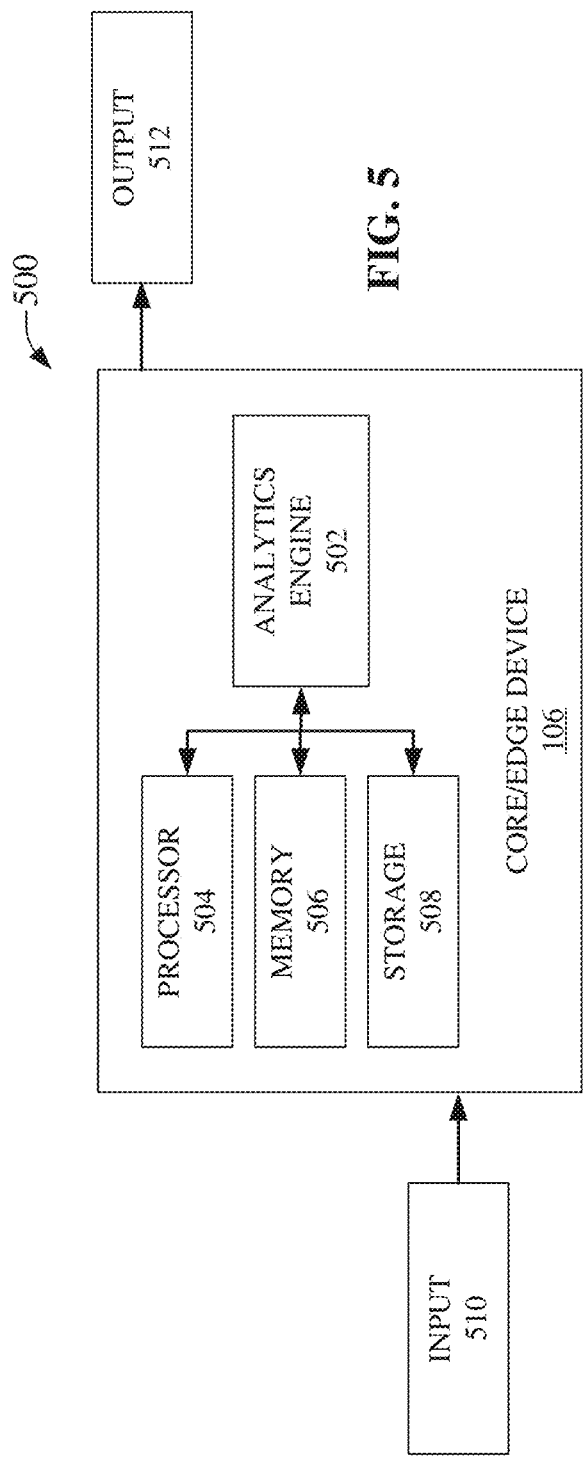
FIG. 5 provides another depiction of a system for the provision of a dynamic cloudlet fog node deployment architecture, in accordance with aspects of the subject disclosure.

FIG. 5 provides depiction of core/edge device 106, now labeled as system 500, for the provision of a dynamic cloudlet fog node deployment architecture, in accordance with various embodiments. System 500 can include analytics engine 502 that can be communicatively coupled to processor 504, memory 506, and storage 508. Analytics engine 502 can be in communication with processor 504 for facilitating operation of computer or machine executable instructions and/or components by analytics engine 502, memory 506 for storing data and/or the computer or machine executable instructions and/or components, and storage 508 for providing longer term storage of data and/or machine and/or computer executable instructions. Additionally, system 500 can also receive input 510 for use, manipulation, and/or transformation by analytics engine 502 to produce one or more useful, concrete, and tangible result and/or transform one or more articles to different states or things. Further, system 500 can also generate and output the useful, concrete, and tangible result and/or the transformed one or more articles produced by analytics engine 502 as output 512.

Analytics engine 502 can receive, via input 510, raw QoS data/metrics, from HFC device 102 for each respective small cell device that can comprise collection of 5G small cell devices 104. Additionally and/or alternatively, analytics engine 502 can receive as input 510 pre-processed QoS data/metrics from HFC device 102.

Analytics engine 502 on receiving the QoS data/metrics (e.g., raw QoS data/metrics and/or pre-processed QoS data/metrics) can store the received QoS data/metrics to memory 506 and/or storage 508, as well as persist the received QoS data/metrics to a database device of a group of database devices. Analytics engine 502 can thereafter perform processing on the received QoS data/metrics.

Analytics engine 502 can perform processing of the recently received QoS data/metrics in conjunction with additional QoS data/metrics that can have been stored to memory 506 and/or storage 508, QoS data/metrics that can have been stored to the database device in regard to each device (e.g., small cell devices and/or one or more devices associated with the IoT) included in the collection of 5G small cell devices 104, as well as QoS data/metrics that can have been received from additional disparate collections of 5G small cell devices that can be situated geographically proximate to the collection of 5G small cell device 104, and/or QoS data/metrics that can have been received from additional disparate collections of 5G small cell devices that can be positioned at geographically remote locations with respect to the collection of 5G small cell device 104.

Analytics engine 502, based on the processing performed on the recently received QoS data/metrics, the additional QoS data/metrics that can have been stored to database devices of groupings of database devices in the context of each device (e.g., small cell devices and/or one or more devices associated with the IoT) included in the collection of 5G small cell devices 104, and/or the QoS data metrics that can have been received within a defined and/or definable period of time in regard to disparate and/or alternative geographically proximate (e.g., abutting, contiguous, adjoining, bordering, . . . ) and/or positionally distant (e.g., peripheral, remote, . . . ) collections of 5G small cell devices, can determine and/or generate one or more value that can be used by system 500 to facilitate one or more adjustment in operation of one or more small cell device included in the collection of 5G small cell devices 104. Typically, the one or more values that facilitate adjustment operations on the one or more small cell devices included in the collection of 5G small cell devices 104 can be directed to the one or more small cell devices via mobile edge computing facilities and/or functionalities associated with HFC device 102. Further, the one or more values determined and/or generated by analytics engine 502 can relate to transmission or broadcast parameters associated with, for example, transmission/broadcast power, antenna settings, and the like. These adjustment operations that can be facilitated by analytics engine 502, via HFC device 102, can be necessitated because one or more of the small cell devices included in the collection of 5G small cell devices 104 is impinging upon a disparate abutting or adjacent collection of 5G small cell devices.

Analytics engine 502 can further perform data analytics (e.g., execute one or more mobile edge computing processes) on the data received from HFC device 102, and as a function of, or based on, the result(s) of the data analytics can define, generate, and/or establish one or more predictive policy rules for HFC device 102 to implement in the context of 5G small cell grouping 104. Analytics engine 502 can thereafter return the predictive policy rules to HFC device 102 for subsequent implementation, for example, to ameliorate a determined surge or a determined diminution by allocating additional access resources, or reallocating access resources to serve and fulfill disparate other purposes.

In regard to the performance of data analytics, analytics engine 502 can use data that can have been received from disparate other HFC devices with which analytics engine 502 can be in communication. Further, analytics engine 502 can also source and marshal data for purposes of data analytics from, for example, a database device of a networked grouping of database devices, wherein the networked grouping of database devices can be associated with a mobile network operator entity. As will be appreciated by those having ordinary skill in the art the sourcing of data for purposes of data analytics can be limitless, disparate, and varied. It is thus to be appreciated that these varied and disparate sources of data are contemplated to be within the purview of the disclosed and described subject matter.

As noted earlier a HFC device (e.g., HFC device 102), based on the predictive policy rules determined and generated by analytics engine 502 and data (e.g., QoS metrics) received from 5G small cell grouping 104, can detect a traffic surge (or traffic diminution) that can be occurring in 5G small cell grouping 104 and in response to detecting the traffic surge can notify analytics engine 502. Analytics engine, in response to receiving the notification of the traffic surge from HFC device 102, can direct HFC device 102 to initiate deployment of one or more on-demand cloudlet instantiation into a cloudlet fog comprising on-demand instantiated cloudlet instantiations.

As has also been noted above, each on-demand dynamic cloudlet can be a specific defined and individuated customization of one or more VM based cloudlet infrastructure using SDN instructions, execution of which can be, facilitated by one or more core/edge device 106 of a grouping of core/edge devices and/or HFC device 102. Further, as has also been noted above, the one or more on-demand dynamic cloudlet can be ephemeral in nature as the existence of on-demand dynamic cloudlet typically will only last for the duration for which the traffic surge (or any event of note) is deemed to exist. Once the traffic surge is deemed to no longer exist, the on-demand dynamic cloudlet can disappear as if it had never existed.

Analytics engine 502 can facilitate dynamic on-demand cloudlet customization and/or instantiation based SDN instructions that can be in execution on core/edge device 106 and/or a device of grouping of devices that can have the functionalities and facilities to supply SDN instructions for the purpose of dynamic on-demand cloudlet customization and/or instantiation. The SDN instructions in accordance with various embodiments can facilitate deployment of customized dynamic on-demand cloudlets into a fog of instantiated dynamic on-demand cloudlets. As has been noted above, each of the dynamic on-demand cloudlets can be instantiated and customized for a unique and specific purpose associated with at least one 5G small cell device that can comprise 5G small cell grouping 104. In accordance with various embodiments, each 5G small cell device can be associated with a customized dynamic on-demand cloudlet (e.g., the dynamic on-demand cloudlet can have been adapted and/or configured specifically for the 5G small cell device). In accordance with these embodiments, when the 5G small cell device exits 5G small cell grouping 104 (e.g., is powered down) the instantiation of the customized dynamic on-demand cloudlet specifically associated the 5G small cell device can disappear, without trace (e.g., as if the customized dynamic on-demand cloudlet instantiation had never existed), from the fog of instantiated dynamic on-demand cloudlets. In accordance with various other embodiments, a 5G small cell device can be associated with more than one instantiated and customized dynamic on-demand cloudlet (e.g., the dynamic on-demand cloudlet can have been adapted and/or configured for disparate unique purposes for the 5G small cell device based, for instance, on a multiplicity of diverse, but unique, QoS criteria). In accordance with these other various embodiments, the customized dynamic on-demand cloudlet instantiation can cease existence when the 5G small cell device, for example, ceases operation. In accordance with yet further embodiments, a 5G small cell device can be associated with a cloudlet instantiated and customized to service a collection of multiple 5G small cell devices based, for example, on a shared commonality of QoS metric. In accordance with these further embodiments, since the 5G small cell device is associated with a collection of 5G small cell devices, the instantiated on-demand cloudlet can have a persistence until the last 5G small cell device of the collection of 5G small cell device has no further use for the instantiated customized dynamic on-demand cloudlet.

While the fog of instantiated cloudlets is in existence, and while each cloudlet with the fog is operational and has utility with respect to a 5G small cell device within the 5G small cell grouping 104, HFC device 102 can be in continuous and/or operable communication with analytics engine 502 (e.g., core/edge device 106) on which the facilities and/or functionalities for the SDN aspects can be hosted; HFC device 102 can continuously supply data related to traffic conditions that can be affecting the 5G small cell grouping 104 as a whole, and/or traffic conditions that can be affecting individual 5G small cell devices that have been associated with one or more instantiated customized dynamic on-demand cloudlet instantiation. Once the purpose for which a particular customized dynamic on-demand cloudlet instantiation has been satisfied, the SDN aspects in collaboration with core/edge device 106 (e.g., analytics engine 502) and/or HFC device 102 can facilitate cleanup of the instantiated customized dynamic on-demand cloudlet instantiation.

Figure 6:
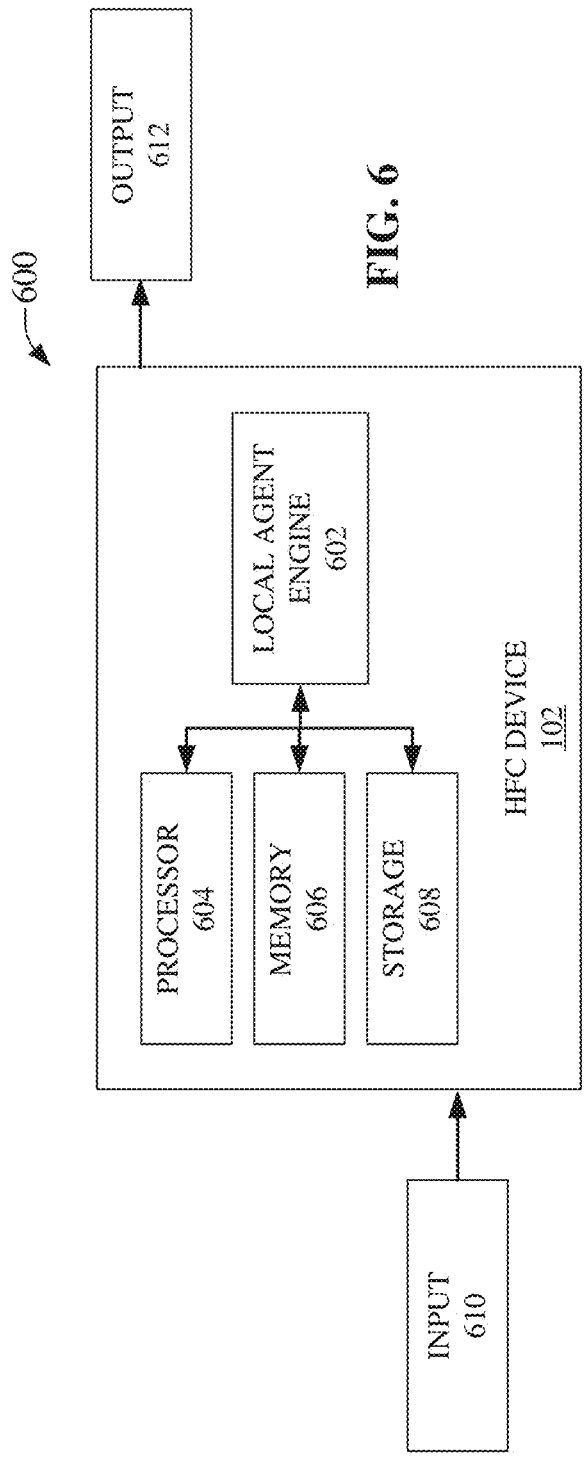
FIG. 6 provides further depiction of a system for the provision of a dynamic cloudlet fog node deployment architecture, in accordance with aspects of the subject disclosure.

FIG. 6 provides depiction of HFC device 102, now labeled as system 600, for the provision of a dynamic cloudlet fog node deployment architecture, in accordance with various embodiments. System 600 can include local agent engine 602 that can be communicatively coupled to processor 604, memory 606, and storage 608. Local agent engine 602 can be in communication with processor 604 for facilitating operation of computer or machine executable instructions and/or components by local agent engine 602, memory 606 for storing data and/or the computer or machine executable instructions and/or components, and storage 608 for providing longer term storage of data and/or machine and/or computer executable instructions. Additionally, system 600 can also receive input 610 for use, manipulation, and/or transformation by local agent engine 602 to produce one or more useful, concrete, and tangible result and/or transform one or more articles to different states or things. Further, system 600 can also generate and output the useful, concrete, and tangible result and/or the transformed one or more articles produced by local agent engine 602 as output 612.

Local agent engine 602 can collect, collate, cluster, and/or classify (e.g., provide a classifying ranking or ordering, in response to for example, an importance value that can be determined based on one or more defined or definable threshold values being met and exceed or not being met and not surpassed) various data from each device included in collection of 5G small cell devices 104 and in response to, based on, and/or as a function of the received data can filter and/or detect (or determine) one or more threshold crossing alert/alarm (TCA) events.

Local agent engine 605 can also perform preprocessing of the received data and can forward the received data as well as the processed data to core/edge device 106. It should be noted that in some embodiments, local agent engine 602 can forward the received data directly to core/edge device 106 prior to performing preprocessing on the received data, in effect operating as a pass through device in this instance, and shortly thereafter (e.g., once performance of preprocessing had completed) send the preprocessed data to core/edge device 106. In additional and/or alternative embodiments, local agent engine 602 can contemporaneously send the received data (e.g., raw data received from one or more 5G small cell device comprising the collection of 5G small cell devices 104) and the preprocessed data to core/edge device 106.

Core/edge device 106 can perform data analytics (e.g., execute one or more mobile edge computing processes) on the data received from local agent engine 602, and as a function of, or based on, the result(s) of the data analytics can define, generate, and/or establish one or more predictive policy rules for local agent engine 602 to implement in the context of 5G small cell grouping 104. Core/edge device 106 can thereafter return the predictive policy rules to local agent engine 602 for subsequent implementation, for example, to ameliorate a determined surge or a determined diminution by allocating additional access resources, or reallocating access resources to serve and fulfill disparate other purposes.

Local agent engine 602, based on the predictive policy rules determined and generated by core/edge device 106 and data (e.g., QoS metrics) received from 5G small cell grouping 104, can detect a traffic surge (or traffic diminution) that can be occurring in 5G small cell grouping 104 and in response to detecting the traffic surge can notify core/edge device 106. Core/edge device 106, in response to receiving the notification or the traffic surge from HFC device 102, can direct local agent engine 602 to initiate deployment of one or more on-demand cloudlet instantiation into a cloudlet fog comprising on-demand instantiated cloudlet instantiations.

Figure 7:
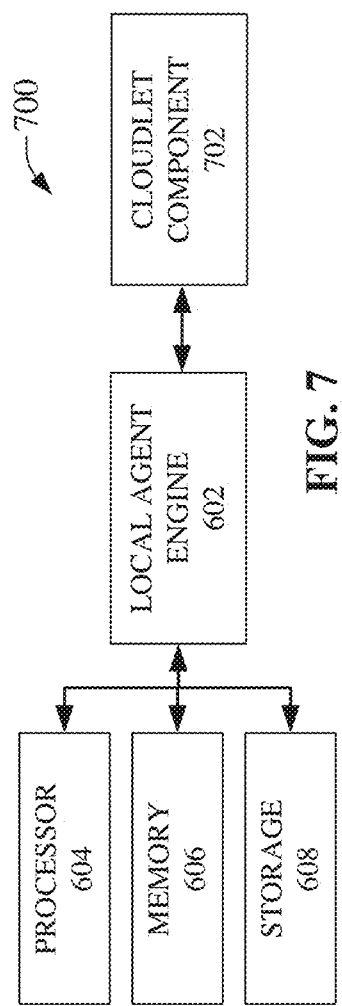
FIG. 7 provides additional illustration of a system for the provision of a dynamic cloudlet fog node deployment architecture, in accordance with aspects of the subject disclosure.

FIG. 7 provides further illustration of HFC device 102, now labeled as system 700, for the provision of a dynamic cloudlet fog node deployment architecture, in accordance with various embodiments. As illustrated, system 700 can comprise local agent engine 602 that can operate in conjunction with cloudlet component 702. Cloudlet component 702 can facilitate dynamic on-demand cloudlet customization and/or instantiation based SDN instructions that can have been received from core/edge device 106 and/or a device of grouping of devices that can have the functionalities and facilities to supply SDN instructions for the purpose of dynamic on-demand cloudlet customization and/or instantiation. The SDN instructions in accordance with various embodiments can facilitate deployment of customized dynamic on-demand cloudlets into a fog of instantiated dynamic on-demand cloudlets. As has been noted above, each of the dynamic on-demand cloudlets can be instantiated and customized for a unique and specific purpose associated with at least one 5G small cell device that can comprise 5G small cell grouping 104. In accordance with various embodiments, each 5G small cell device can be associated with a customized dynamic on-demand cloudlet (e.g., the dynamic on-demand cloudlet can have been adapted and/or configured specifically for the 5G small cell device). In accordance with these embodiments, when the 5G small cell device exits 5G small cell grouping 104 (e.g., is powered down) the instantiation of the customized dynamic on-demand cloudlet specifically associated the 5G small cell device can disappear, without trace (e.g., as if the customized dynamic on-demand cloudlet instantiation had never existed), from the fog of instantiated dynamic on-demand cloudlets. In accordance with various other embodiments, a 5G small cell device can be associated with more than one instantiated and customized dynamic on-demand cloudlet (e.g., the dynamic on-demand cloudlet can have been adapted and/or configured for disparate unique purposes for the 5G small cell device based, for instance, on a multiplicity of diverse, but unique, QoS criteria). In accordance with these other various embodiments, the customized dynamic on-demand cloudlet instantiation can cease existence when the 5G small cell device, for example, ceases operation. In accordance with yet further embodiments, a 5G small cell device can be associated with a cloudlet instantiated and customized to service a collection of multiple 5G small cell devices based, for example, on a shared commonality of QoS metric. In accordance with these further embodiments, since the 5G small cell device is associated with a collection of 5G small cell devices, the instantiated on-demand cloudlet can have a persistence until the last 5G small cell device of the collection of 5G small cell device has no further use for the instantiated customized dynamic on-demand cloudlet.

While the fog of instantiated cloudlets is in existence, and while each cloudlet with the fog is operational and has utility with respect to a 5G small cell device within the 5G small cell grouping 104, cloudlet component 702 via the functionalities and/or facilities provided by HFC device 102 can be in continuous and/or operable communication with core/edge device 106 on which the facilities and/or functionalities for the SDN aspects can be hosted; cloudlet component 702 via the aegis of HFC device 102 can continuously supply data related to traffic conditions that can be affecting the 5G small cell grouping 102 as a whole, and/or traffic conditions that can be affecting individual 5G small cell devices that have been associated with one or more instantiated customized dynamic on-demand cloudlet instantiation. Once the purpose for which a particular customized dynamic on-demand cloudlet instantiation has been satisfied, the SDN aspects in collaboration with core/edge device 106 and/or cloudlet component 702 can facilitate cleanup of the instantiated customized dynamic on-demand cloudlet instantiation.

Figure 8:
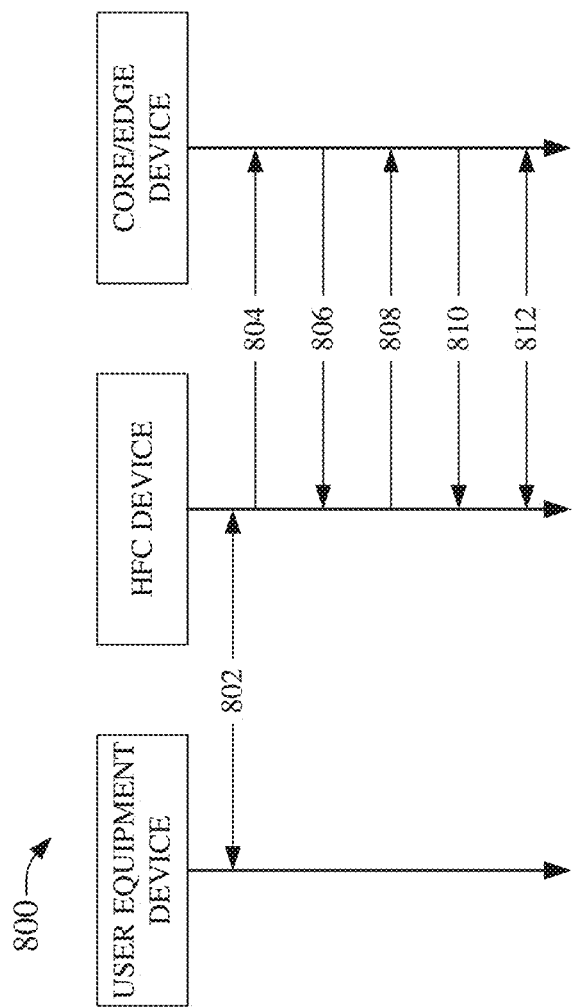
FIG. 8 provides illustration of a flow chart or method for the provision of a dynamic cloudlet fog node deployment architecture, in accordance with described embodiments of the subject disclosure.

In view of the example system(s) described above, example method(s) that can be implemented in accordance with the disclosed subject matter can be better appreciated with reference to the flowcharts in FIG. 8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates a method 800 for the provision of a dynamic cloudlet fog node deployment architecture, in accordance with various embodiments. Method 800 can commence at act 802 wherein a UE device (e.g., a 5G small cell device included in a 5G small cell grouping of small cell devices (5G small cell grouping 104)) can be in operative communication with a HFC device (e.g., HFC device 102) for the provision of various QoS data.

At act 804 the HFC device can accumulate, classify, and/or collate the data fed back from the UE device, and further can perform preprocessing on the data received from the UE device. Also at act 804 the HFC device can forward the preprocessed data and the data originally received from the UE device to a core/edge device (e.g., core/edge device 106).

At act 806 the core/edge device can perform data analytics on the data received from the HFC device and based on the data analytics can define and generate predictive policy rules that can be used to determined when and if traffic surges with regard to a UE device (or within the 5G small cell grouping of small cell devices). At 806 the core/edge device can return the predictive policy rules to the HFC device, whereupon the HFC device an facilitate implementation of the predictive policy rules in relation to individual UE devices that can comprise the 5G small cell grouping of small cell devices.

At 808 the HFC device in response to detecting potential traffic surges, based at least in part of the returned predictive policy rules, can notify the core/edge device (on which SDN facilities and/or functionality can have been persisted) that one or more on-demand cloudlet should be instantiated, and released into a cloud of fog nodes that can be maintained and managed by the HFC device, to service one of more of the 5G small cell devices included in the 5G small cell grouping of small cell devices.

At 810 the HFC device in collaboration with the core/edge device can dynamically instantiate one or more cloudlet into a cloud of fog nodes. The dynamic instantiation of the one or more cloudlets can be based on SDN instructions that can be operational, or facilitated by the HFC device and/or the core/edge device. At 812 for the duration of the on-demand cloudlet, the HFC device and the core/edge device can be in a continuous handshake relationship in regard to the traffic condition so that the SDN instructions in execution to facilitate operation of the one or more cloudlets to service the UE device can be dynamically adjusted/adapted to adapt to the changing requirements of the traffic flow. Also at 812, once the utility of cloudlet instantiation has been satisfied, the cloudlet, in accordance the pre-established predictive policy, can cease to exist and its existence erased from the cloud of fog nodes It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 9:
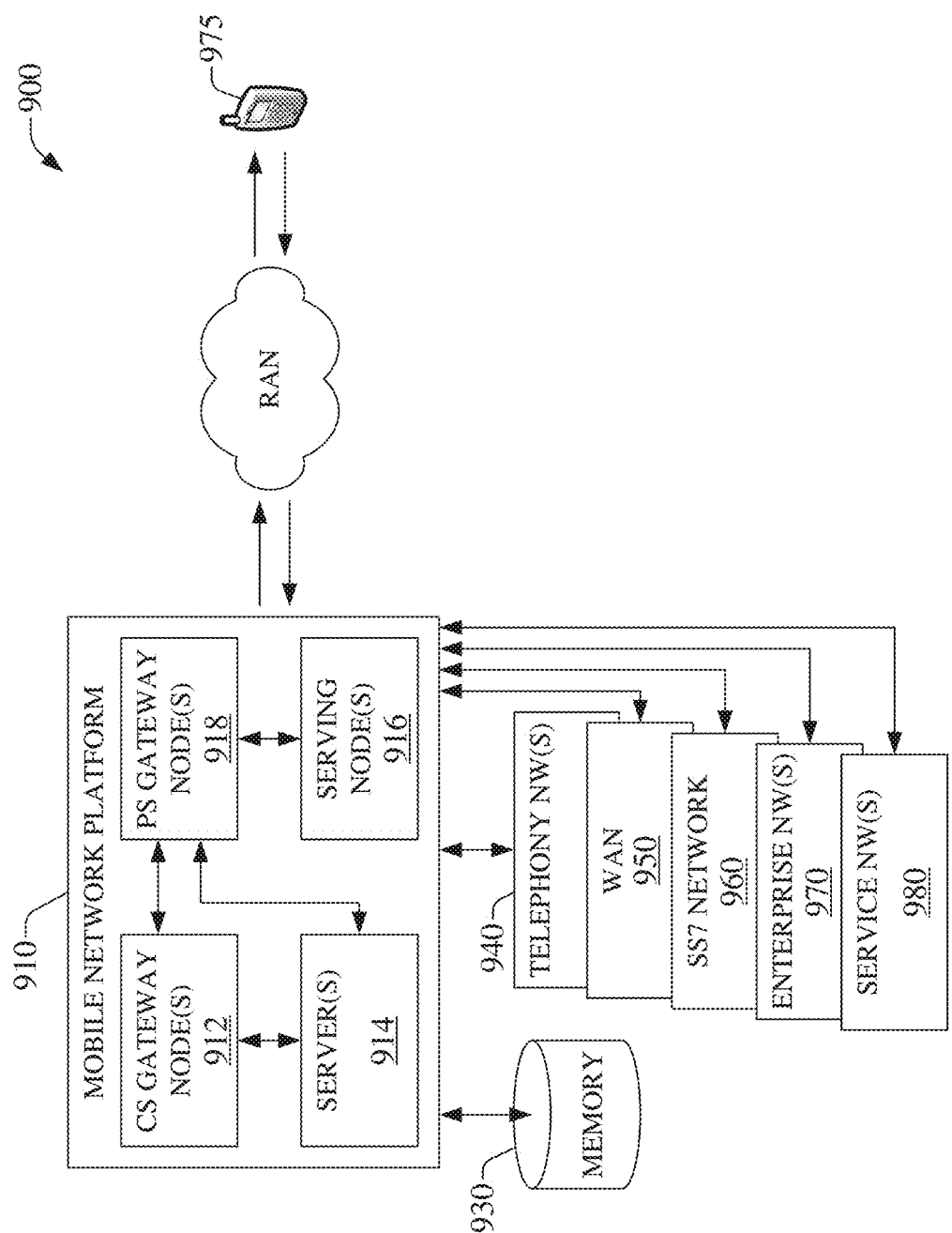
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processors can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
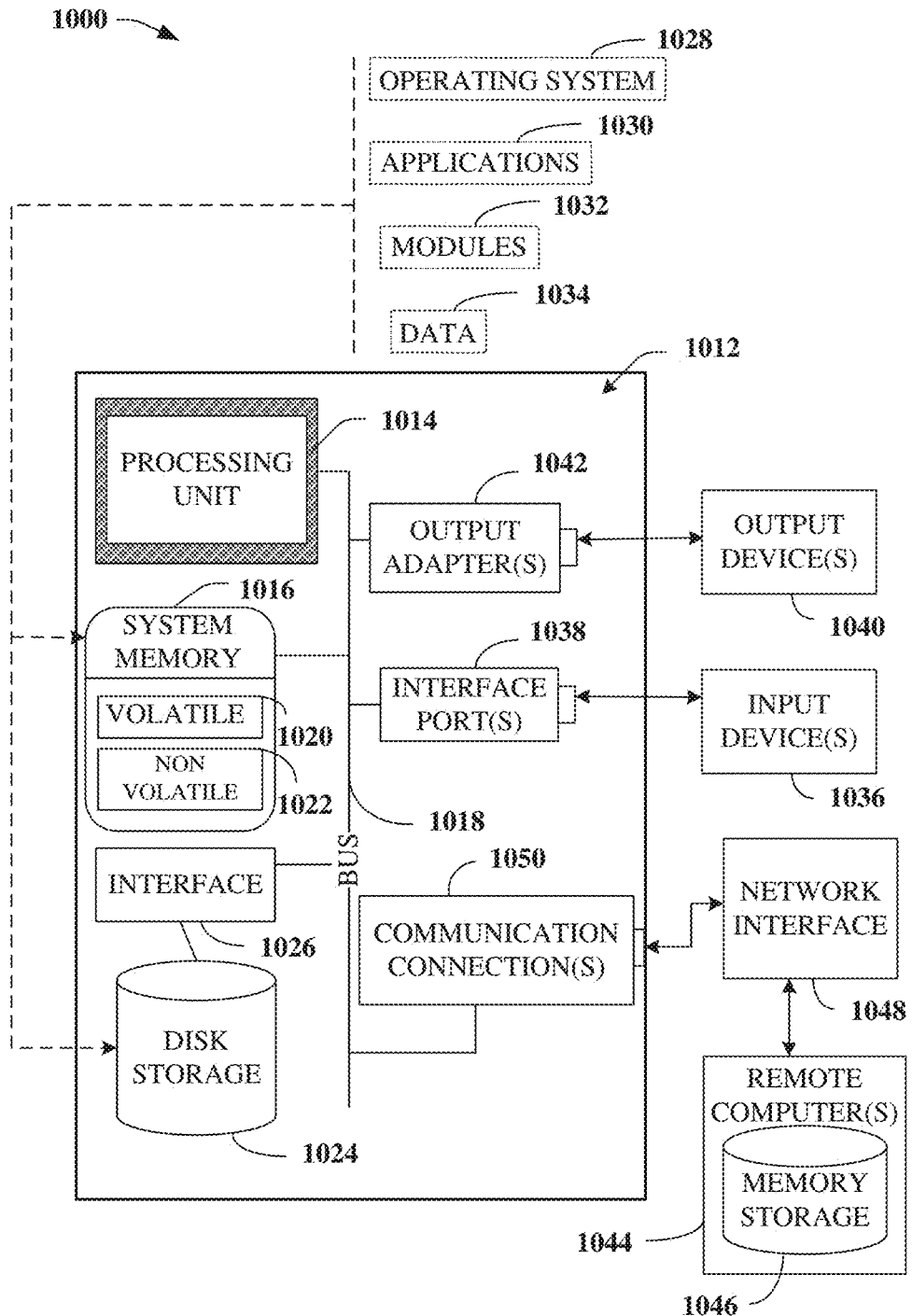
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Network equipment, comprising:
   a processor; and
   a memory that stores executable instructions that, when executed by the processor, facilitate performance of operations, comprising:
   determining, based on a predictive policy comprising a rule, that a network traffic surge has occurred in relation to a user equipment configured to operate according to a communication network protocol applicable to a network comprising the network equipment; and
   in response to determining that the network traffic surge has occurred, instantiating a node to execute a cloud data center associated with the user equipment, and including the node in a group of nodes.

2. The network equipment of claim 1, wherein the user equipment is a first user equipment, and wherein the determining comprises determining that the network traffic surge has occurred based on an entry of a second user equipment into a defined tracking area associated with the first user equipment.

3. The network equipment of claim 1, wherein the user equipment is a first user equipment, and wherein the determining comprises determining that the network traffic surge has occurred based on audio and video data received from audio and video capture equipment and gait data representative of a gait associated with a user identity, and wherein the gait data is received from gait recognition equipment positioned within a defined tracking area associated with the first user equipment.

4. The network equipment of claim 1, wherein the operations further comprise, based on the network traffic surge, allocating, by the network equipment, a group of resources for use by the node to execute the cloud data center.

5. The network equipment of claim 1, wherein the user equipment is a first user equipment, and wherein the operations further comprise, based on a commonality of characteristic representing a quality of service metric, grouping the first user equipment and a second user equipment and associating the first user equipment and the second user equipment with the node.

6. The network equipment of claim 1, wherein the user equipment is a first user equipment, wherein the cloud data center is a virtual machine instantiation created with a group of resources determined based on a commonality of a characteristic, and wherein the commonality of the characteristic is determined based on coordinates of coordinate data associated with the first user equipment and a second user equipment.

7. The network equipment of claim 1, wherein the user equipment is a first user equipment, and wherein the cloud data center is a virtual machine instantiation established based on a first proximity of the first user equipment to the network equipment and a second proximity of a second user equipment to the network equipment.

8. The network equipment of claim 1, the user equipment is a first user equipment, and wherein the operations further comprise, based on the first user equipment executing a streaming application with a packet timing requirement and a second user equipment executing the streaming application, associating the first user equipment with the node and associating the second user equipment with the node.

9. A method, comprising:
based on a predictive policy rule representing a quality of service metric, determining, by a device comprising a processor, that a communication traffic surge has occurred in relation to a user equipment, wherein the device and the user equipment are configured to operate according to a same network protocol; and
to address the communication traffic surge, instantiating, by the device, a node comprising a cloud data center associated with the user equipment and including, by the device, the node in a group of instantiated nodes.

10. The method of claim 9, wherein the cloud data center is customized based on an attribute associated with quality of service metric data representative of a quality of service for communication traffic associated with the user equipment.

11. The method of claim 9, wherein the cloud data center modifies respective operational parameters associated with the user equipment by adjusting respective azimuth values associated with antennas used by the user equipment.

12. The method of claim 9, wherein the cloud data center modifies an operation parameter of the user equipment by modifying a broadcast power value associated with transmission power used by the user equipment to transmit data packets with other user equipment.

13. The method of claim 9, wherein the user equipment is a first user equipment, wherein the first user equipment is geographically proximate with a second user equipment, and wherein the predictive policy rule is determined based on a first quality of service metric associated with the first user equipment and a second quality of service metric associated with the second user equipment.

14. The method of claim 9, wherein the user equipment is a first user equipment, wherein the first user equipment is geographically remote from a second user equipment, and wherein the predictive policy rule is determined based on a first quality of service metric associated with the first user equipment and a second quality of service metric associated with the second user equipment.

15. The method of claim 9, wherein the cloud data center is a first instantiation of a first cloud data center customized for a first user equipment, wherein the method further comprises instantiating, by the device, a second cloud data center customized for a second user equipment, and wherein instantiating the second cloud data center is based on a commonality of the predictive policy rule between the first user equipment and the second user equipment.

16. A non-transitory machine-readable medium, comprising executable instructions that, when executed by a processor, facilitate performance of operations, comprising:
based on a predictive policy rule representing a quality of service metric, determining that a communication traffic overflow has occurred in relation to communication equipment configured to operate according to a defined network protocol;
responsive to the communication traffic overflow, instantiating a node to operate as a cloud data center associated with the communication equipment; and
grouping the cloud data center into a group of instantiated cloud data centers.

17. The non-transitory machine-readable medium of claim 16, wherein the cloud data center is customized based on an attribute associated with the quality of service metric data associated with the communication equipment.

18. The non-transitory machine-readable medium of claim 16, wherein the communication equipment is first communication equipment, wherein the first communication equipment is geographically proximate with second communication equipment, and wherein the predictive policy rule is determined based on a first quality of service metric associated with the first communication equipment and a second quality of service metric associated with the second communication equipment.

19. The non-transitory machine-readable medium of claim 16, wherein the communication equipment is first communication equipment, wherein the first communication equipment is geographically remote from a second communication equipment, and wherein the predictive policy rule is determined based on a first quality of service metric associated with the first communication equipment and a second quality of service metric associated with the second communication equipment.

20. The non-transitory machine-readable medium of claim 16, wherein the communication equipment is first communication equipment, and wherein the operations further comprise, based on the first communication equipment executing an application with a timing requirement and second communication equipment executing the application, associating the first communication equipment with the cloud data center and associating the second user equipment with the cloud data center.

* * * * *